United States Patent [19]

Leist

[11] Patent Number: 5,024,164
[45] Date of Patent: Jun. 18, 1991

[54] MOBILE STORAGE SYSTEM WITH IMPROVED DRIVING ASSEMBLIES

[75] Inventor: Alan R. Leist, Grand Rapids, Mich.

[73] Assignee: Pipp Mobile Systems, Inc., Grand Rapids, Mich.

[21] Appl. No.: 533,082

[22] Filed: Jun. 4, 1990

Related U.S. Application Data

[62] Division of Ser. No. 162,644, Feb. 29, 1988, Pat. No. 4,944,231.

[51] Int. Cl.$^5$ .................................... B61C 11/04
[52] U.S. Cl. .................................... 105/101; 105/89; 105/127
[58] Field of Search ............... 104/132, 236, 237, 287, 104/162; 105/29.1, 29.2, 31, 89, 101, 127; 295/4; 238/123; 211/1.5, 151, 162; 312/198, 199, 200; 293/DIG. 1

[56] References Cited

U.S. PATENT DOCUMENTS

| | | | |
|---|---|---|---|
| 6,321 | 4/1849 | Hoyt | 105/29.1 |
| 443,768 | 12/1890 | Hunt | 105/29.1 |
| 772,679 | 10/1904 | Sperry | 105/29.1 |
| 1,027,077 | 5/1912 | Sessions | 105/29.1 |
| 1,039,545 | 9/1912 | Knight | 104/56 |
| 1,728,726 | 9/1929 | Fink | 105/29.1 |
| 2,166,704 | 7/1939 | Foulkes | 312/199 |
| 2,652,785 | 9/1953 | Cox | 105/29.1 |
| 2,700,345 | 1/1955 | Cox | 105/29.1 |
| 2,707,442 | 5/1955 | Ingold | 105/31 |
| 2,915,195 | 12/1959 | Crosby | 211/143 |
| 3,080,204 | 3/1963 | Lindhgren | 312/199 |
| 3,168,361 | 2/1965 | Naito | 312/199 |
| 3,225,705 | 12/1965 | Heinzl | 105/29 |
| 3,535,009 | 10/1970 | Cain | 312/199 |
| 3,540,153 | 11/1970 | Aoki | 105/29.2 X |
| 3,566,802 | 3/1971 | Lundqvist | 104/172 |
| 3,567,299 | 3/1971 | Lundqvist | 312/199 |
| 3,640,595 | 2/1972 | Staller et al. | 312/198 |
| 3,829,189 | 8/1974 | Staller | 312/198 |
| 3,854,418 | 12/1974 | Bertin | 105/29.1 |
| 3,854,616 | 12/1974 | Willis et al. | 214/620 |
| 3,923,354 | 12/1975 | Young | 312/201 |
| 3,933,400 | 1/1976 | Helgeson | 312/223 |
| 3,967,868 | 7/1976 | Baker, Jr. | 312/201 |
| 4,123,126 | 10/1978 | Querengasser | 312/201 |
| 4,149,644 | 4/1979 | Fuller | 414/607 |
| 4,160,509 | 7/1979 | Switzer | 414/607 |
| 4,229,135 | 10/1980 | Malmros | 414/284 |
| 4,290,730 | 9/1981 | Weaver | 414/607 |
| 4,326,753 | 4/1982 | Rynik | 105/29.1 X |
| 4,417,524 | 11/1983 | Quinn et al. | 105/101 |
| 4,421,365 | 12/1983 | Taniwaki | 104/287 X |
| 4,422,384 | 12/1983 | Johnson et al. | 105/29 R |
| 4,467,924 | 8/1984 | Morcheles | 211/1.5 |
| 4,597,615 | 7/1986 | Steger | 312/201 |

Primary Examiner—Robert J. Oberleitner
Assistant Examiner—S. Joseph Morano
Attorney, Agent, or Firm—Warner, Norcross & Judd

[57] ABSTRACT

A mobile storage system including a plurality of one-piece track members each defining a guideway and a series of longitudinally spaced holes. The system also includes a carriage rotatably supported on the track members on rollers riding in the guideways. A drive mechanism on the carriage includes a sprocket which directly engages the unitary holes in each track member. In a preferred embodiment for heavy units, the drive mechanism includes a pair of such sprockets mounted on a common shaft driven at a midpoint to reduce carriage canting.

15 Claims, 5 Drawing Sheets

MOBILE STORAGE SYSTEM WITH IMPROVED DRIVING ASSEMBLIES

This is a division of application Ser. No. 162,644, filed Feb. 29, 1988 (now U.S. Pat. No. 4,944,231).

BACKGROUND OF THE INVENTION

The present invention pertains to mobile storage systems including driving assemblies for moving mobile storage units across a floor surface.

Mobile storage systems have been developed in order to maximize the amount of available storage space in a minimum amount of floor space. When storage units, such as shelves or the like, are arranged in a typical fashion, much of the floor space is lost due to the provision of aisle space between each row of shelves in order to permit access to the stored material. Since most of the aisle space is not in use at any given time, mobile storage systems have been developed to more effectively use the available floor space. Generally, mobile storage systems fill the floor with rows of shelving units or the like so that only a single aisle is provided in the entire storage area. Access to the material stored upon a particular unit is facilitated by moving certain of the mobile shelving units so that the one aisle provided is now adjacent the unit having the stored material to be retrieved.

These systems initially were designed so that the mobile storage units were moved manually by the worker. However, this proved to be a cumbersome task and virtually impossible with large mobile storage units. Hence, many drive assemblies have been developed for assisting the movement of each unit. Although these systems have eased and quickened the procedures for retrieving stored material, they have also been of a very complicated nature involving a high number of parts. This multiplicity of parts, in turn, greatly increases the manufacturing and purchase cost. Furthermore, many of these systems, in part due to their complexity, are susceptible to disrepair and high maintenance requirements

SUMMARY OF THE INVENTION

The aforementioned problems are overcome in the present invention, wherein the mobile storage units may be easily and efficiently moved by a compact and sturdy driving assembly.

The storage system of the present invention includes unitary track members which are mounted upon the floor or other supporting surface and are provided with an upper surface having a series of openings or apertures which are aligned longitudinally along the length of the track member. Also along the upper surface of each track member is a guideway which is substantially parallel to the series of openings Movably mounted upon each track member is a support structure. The support structures receive and support the mobile storage units for the requisite movements. The support structures further include rollers which are movably supported in the track's guideway, and a driving sprocket which interacts and cooperates with the series of openings to thereby effect the movement of the support structure and its associated mobile storage unit along the length of the track.

By using the driving assembly of the present invention, the disadvantages heretofore experienced regarding the prior art's complexity, weaknesses and susceptibility to disrepair are overcome. The track members utilized are of a unitary configuration to increase the strength of the unit and the reliability of its driving interaction with the driving sprocket. Moreover, by fashioning a single unitary track member to include both a series of openings for driving the mobile storage units and a guideway for supporting the units through their associated supporting structures, the cost of manufacturing and the time spent in setting up the system or moving the system from one room to another is greatly reduced.

These and other objects, advantages and features of the present invention will be more fully understood and appreciated by reference to the written specification and appended drawings.

DETAILED DESCRIPTION OF THE PREFERRED EMBODIMENT

In the preferred embodiment, the mobile shelving system comprises a plurality of track members 12 and a support structure or carriage 14, having a drive mechanism 16, movably mounted upon each track member 12. Support structure 14, in turn, supports a mobile storage unit 17 for movement along the length of track members 12.

Track members 12 are elongated, unitary members (FIGS. 1–4). Preferably, track members 12 are fabricated as extruded metal members, such as from aluminum. Track members 12 have a generally flat cross-sectional configuration with upper and lower surfaces 18, 19. Lower surfaces 19 are adapted to engage the floor or other supporting surface 20 upon which the mobile storage units 17 are to be placed. Preferably, steel plates 21 are provided under the track members 12 (see FIG. 4); and the track members can be leveled thereabove using spaced adjusting screws 22. Screws 22 are preferably threadedly received by T-nuts 24 which are positioned within apertures 26 intermediately spaced between openings 33. Upper surface 18 is provided with a guideway 23 (FIGS. 3 and 4) which extends axially along the length of track member 12. Guideway 23 is a specially configured groove having a pair of opposed, axially extending, elongated pockets 25. Pockets 25 are oriented at an angle to the horizontal, and to each other, to thereby define a substantially V-shaped channel.

Preferably, their angle of inclination (to the horizontal) is about 45 degrees. Matingly received within pockets 25 are a pair of wear plates 27 which are adapted to support rollers 31, as will be discussed more fully below.

Figure 1:
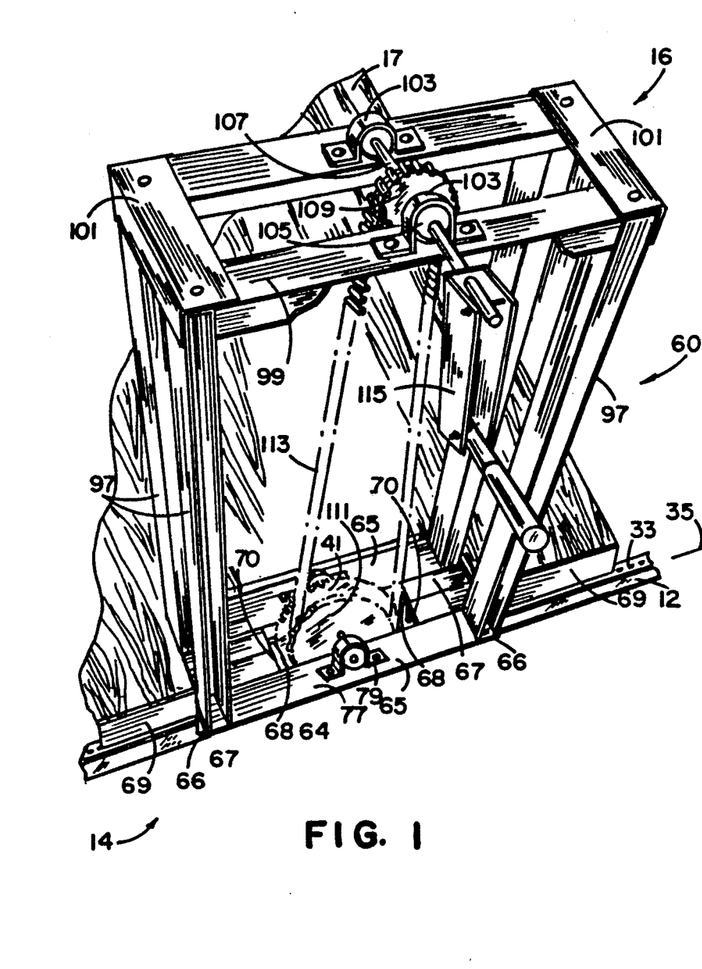
FIG. 1 is a perspective view of a first embodiment of the present invention.
Figure 3:
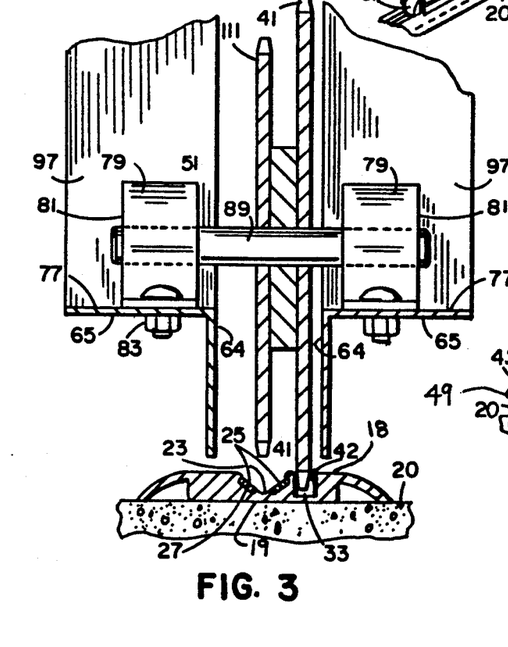
FIG. 3 is an enlarged cross-sectional view taken along lines III—III in FIG. 2.

Also extending longitudinally along upper surface 18 of each track member 12 are a series of openings or holes 33 (FIGS. 1 and 3). Openings 33 are aligned in a row which is substantially parallel to guideway 23. Preferably, guideway 23 is positioned along the longitudinal axis 35 of track member 12 and aligned openings 33 are offset therefrom such that they are positioned between guideway 23 and a sidewall 37 of track member 12 Openings 33 are spaced apart a predetermined distance so as to cooperate with a driving sprocket 41 as will be more fully discussed below. Wear inserts 42 (FIG. 3) are also preferably provided in openings 33 to receive the engagement and pressure of the driving sprocket 41.

Figure 4:
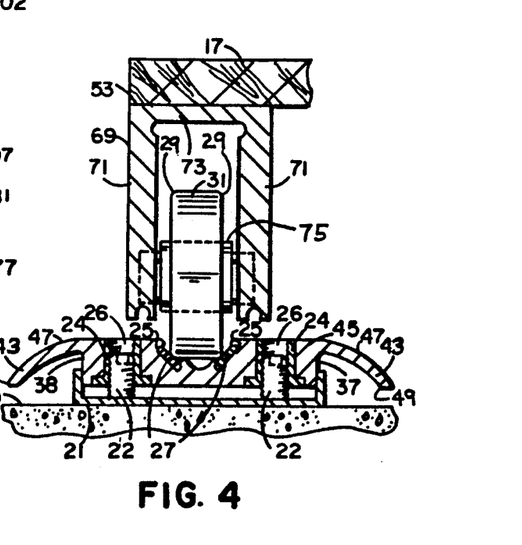
FIG. 4 is an enlarged cross-sectional view taken along lines IV—IV in FIG. 2.

Extending outwardly from each side of upper surface 18 is an arcuate flange 43 (FIGS. 3 and 4). Each flange 43 is provided with a first end 45 which is fixedly attached to one sidewall 37, 38 such that the flange's upper surface 47 creates a smooth continuous appearance with upper surface 18. Arcuate flange 43 gradually slopes downwardly such that its second end 49 lies in the same plane as lower surface 19 to provide a ramping surface for wheeled vehicles, such as forklift trucks, which may be used in accessing items on the shelving.

Preferably, two or more track members 12 are positioned along the floor or the like 20 in a parallel relationship with each other. The number of track members 12 required will depend upon the length of the mobile storage units 17 and the weight to be supported.

Movably mounted upon each track member 12 is a support structure or carriage 14 (FIGS. 1-4). Support structures 14, having supporting rollers 31, are rollingly guided by track members 12 for movement along the length thereof. Further, each support structure 14 includes a mounting surface 53 which receives thereon and supports a portion of a mobile storage unit 17. In this way, mobile storage units 17 are mounted for movement along the predetermined path defined by track members 12.

In a first embodiment 60 (FIGS. 1-4), at least two track members 12 and corresponding support structures 14 are provided to support opposing sides of a mobile storage unit 17. Of course, more than two could be utilized if one or more of the support structures 14 were placed intermediately of the ends of the mobile storage unit 17. In embodiment 60, the two support structures 14 are interconnected solely by the mobile storage unit 17 This interconnection, along with the use of driving sprockets 41 as will be described below, allows the assembly 60 to work smoothly and easily on all but the large and heavy mobile storage units 17.

Each support structure 14 (FIGS. 1-4) is provided with a pair of longitudinal brace members 65 which are substantially parallel to each other. Brace members 65 are fixedly attached to one another and separated on each end by a spacer member 67 and an elongated supporting arm 69. Brace members 65, spacer members 67 and supporting arms 69 are all fixedly connected together by any well known means, such as by bolting or welding. Elongated supporting arms 69 extend outwardly from each of the ends 66 of brace members 65. The inner ends 68, 70 of spacer members 67 and elongated supporting arms 69, respectively, in combination with the inside edges 64 of brace members 65 collectively define an inner cavity 51 bounded on each side. Preferably, these members are fabricated from any suitable metal (e.g. aluminum), although any suitable material could be utilized.

Supporting arms 69 are preferably extruded channel members having a pair of legs 71 interconnected by a bight 73 at one end (FIG. 4). Arms 69 are of a substantially inverted U-shaped configuration. At each end of each supporting arm 69 is a roller 31 which is mounted between legs 71 via an axle structure 75. Rollers 31 extend below legs 71 and engage guideways 23 such that they are rollingly supported thereby and contained therein to ensure travel of the mobile storage unit 17 along the predetermined path defined by the track members 12. The guiding containment is best facilitated by engaging the edges 29 of rollers 31 on the inclined wear plates 27.

Figure 2:
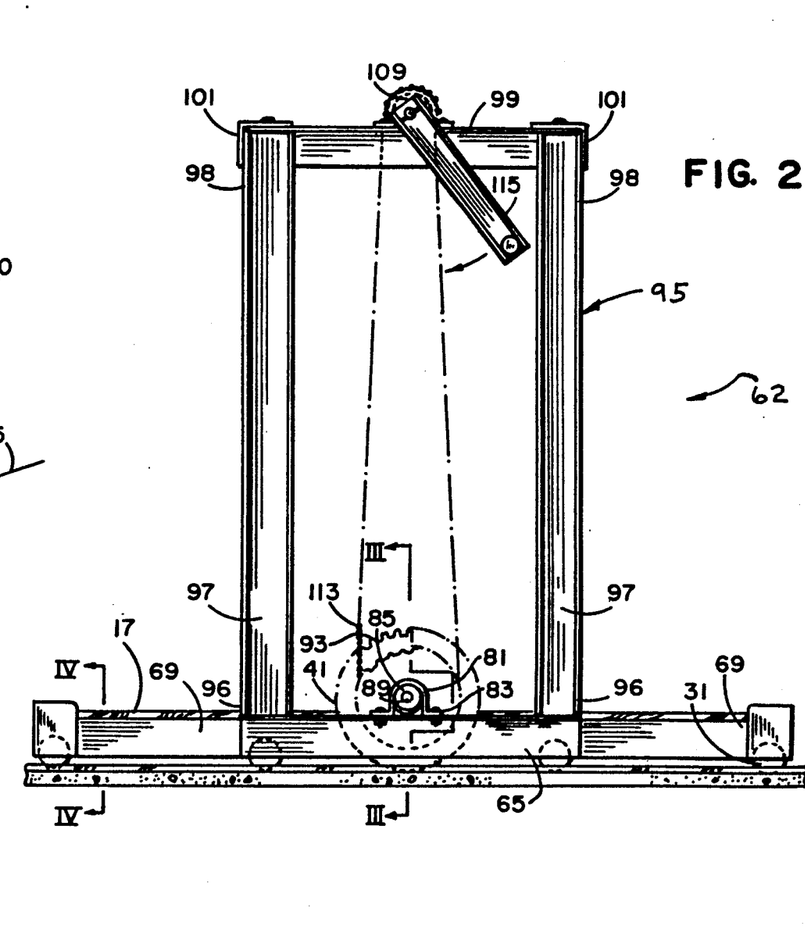
FIG. 2 is a side elevational view thereof.

Attached centrally, along the upper surface 77 of each brace member 65 is a bearing element 79 (FIGS. 1 and 2). Each bearing element 79 is provided with an upstanding body 81 and a pair of oppositely extending feet 83. Feet 83 lie along upper surface 77 and are fixed thereto through well known means such as bolting, welding, etc. Upstanding body 81 is provided with a central bore 85. Central bores 85 in opposing bearing elements 79 are aligned for receiving therethrough a drive shaft 89 which extends across the defined inner cavity 51.

Mounted upon drive shaft 89, in cavity 51 and directly over the series of openings 33 in the corresponding track member 12, is a driving sprocket 41 (FIGS. 1 and 3). Driving sprocket 41 includes a plurality of radially extending teeth 93 which are spaced apart a predetermined distance such that teeth 93 are received within sequential openings 33 in track member 12 when driving sprocket 41 is rotated. In this way, driving sprocket 41 drives the support structure 14 along the length of track member 12 in either direction.

One of the support structures 14 supporting an end of the supported mobile storage unit 17 further includes a manual driving arrangement 62 which includes an upper framework 95 (FIGS. 1 and 2). Upper framework 95 comprises a plurality of upstanding legs 97 which are, at their lower ends 96, fixedly attached to brace members 65 and, at their upper ends 98, are interconnected by longitudinal supports 99 and transverse supports 101. Mounted to longitudinal pair of bearing elements 103. Bearing elements 103 are provided with aligned bores 105 through which is received axle 107. Axle 107 fixedly mounts, for rotation therewith, a pinion sprocket 109 between longitudinal supports 99. Directly below pinion sprocket 109 and juxtaposed driving sprocket 41 on drive shaft 89, is a sprocket wheel 111. Sprocket wheel 111 is fixedly secured to drive shaft 89 to impart rotation thereto as is explained below. Chain 113 operably connects pinion sprocket 109 and sprocket wheel 111 for synchronous rotation. A manual turning means, such as crank 115, is preferably fixed onto one end of axle 107 to thereby facilitate easy driving of the support structure along track member 12.

More specifically, as a user rotates crank 115 axle 107 is rotated. The rotation of axle 107 rotates pinion sprocket 109 which, through its interconnection with chain 113, rotates sprocket wheel 111. Sprocket wheel 111, in turn, rotates drive shaft 89 which then rotates driving sprocket 41. As driving sprocket 41 rotates, its teeth 93 sequentially engage the series of openings 33 along the length of track member 12 so that support structure 14 is given the desired movement.

As mentioned above, in embodiment 60, only one support structure 14 is driven. The remaining support structures 14 roll along their corresponding track member 12 as the mobile storage unit 17 is moved. Nevertheless, each support structure 14 is provided with a driving sprocket 41. These driving sprockets 41 not only increase the stability of the support structure 14 by providing another point of contact on track member 12, but also help to synchronize the movement with the driven support structure 14 through the interengagement of their teeth 93 with openings 33.

Figure 5:
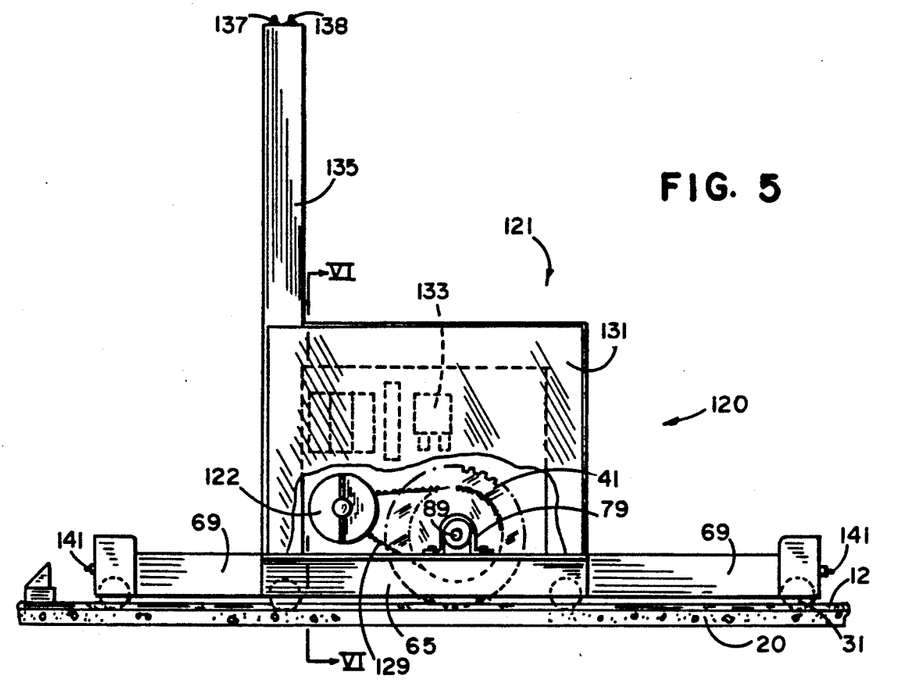
FIG. 5 is a side elevational view of a second embodiment of the present invention.
Figure 6:
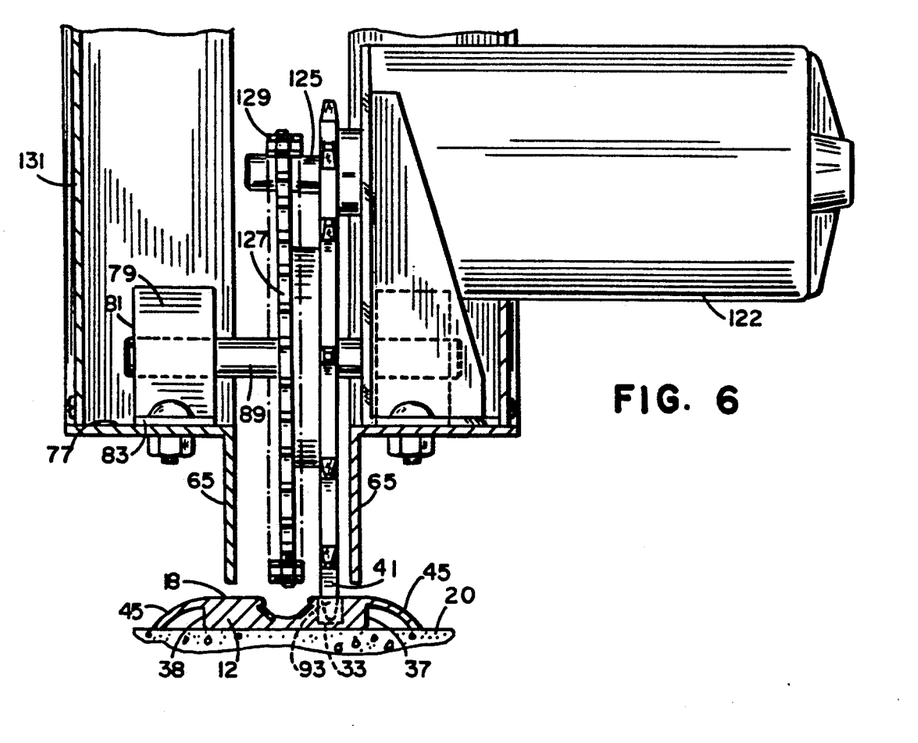
FIG. 6 is an enlarged cross-sectional view taken along lines VI—VI.

In the second embodiment 120 (FIGS. 5 and 6), the manual driving arrangement 62 is replaced with an electrically powered driving unit 121. As can be seen in FIG. 5, drive shaft 89 supports driving sprocket 41 and sprocket wheel 111 in the same manner as in first embodiment 60. However, in place of upper framework 95, pinion sprocket 109 and hand crank 115, is an electric motor 122 having an outwardly extending output shaft 125. Preferably, motor 122 is mounted directly upon one brace member 65 although any suitable structural arrangement could be used. Fixedly mounted on output shaft 125 is a pinion sprocket 127. Pinion sprocket 127 is operably interconnected with sprocket wheel 111 through the use of a chain 129.

Electric motor 122 (FIG. 2) is a bi-directional motor, so that the drive assembly 120 and its supported mobile storage unit 17 may be moved in either direction along the length of track members 12. A housing 131 is placed over the driving mechanisms for protection thereof, and easy mounting of conventional controls 133 for electric motor 122. Upstanding beam 135, which is secured to housing 131, mounts thereon within easy reach of a user a pair of switches 137, 138 for actuation of forward or rearward movement of the drive assembly 120. Also, at the ends of each supporting arm 69 is provided a limit switch 141 which turns the electric motor off when the support structure 14 reaches the end of the track, another supporting structure 14 or other obstacle.

A third embodiment 150 (FIGS. 7 and 8) is also disclosed and is adapted for moving particularly large and heavy mobile storage units 17. The main difficulty encountered in large and heavy storage units, when the driving action is provided at one end thereof, is that the drive assemblies tend to cant and jam under the heavy load. Hence, it is desirable to distribute driving impetus for drive assembly 150 throughout the width of the assembly.

Figure 7:
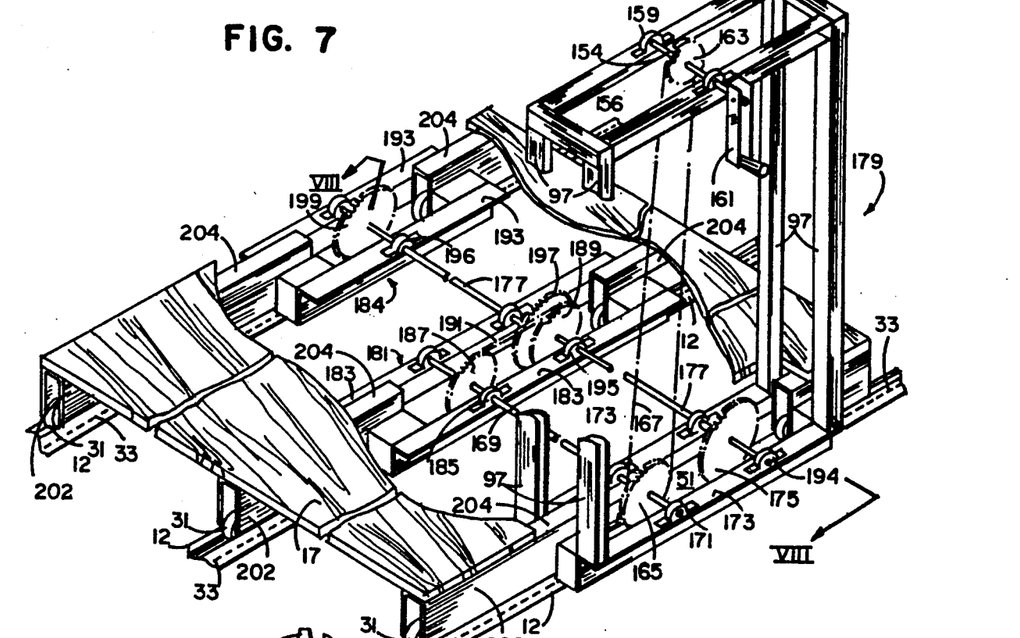
FIG. 7 is a perspective view of a third embodiment of the present invention.
Figure 8:
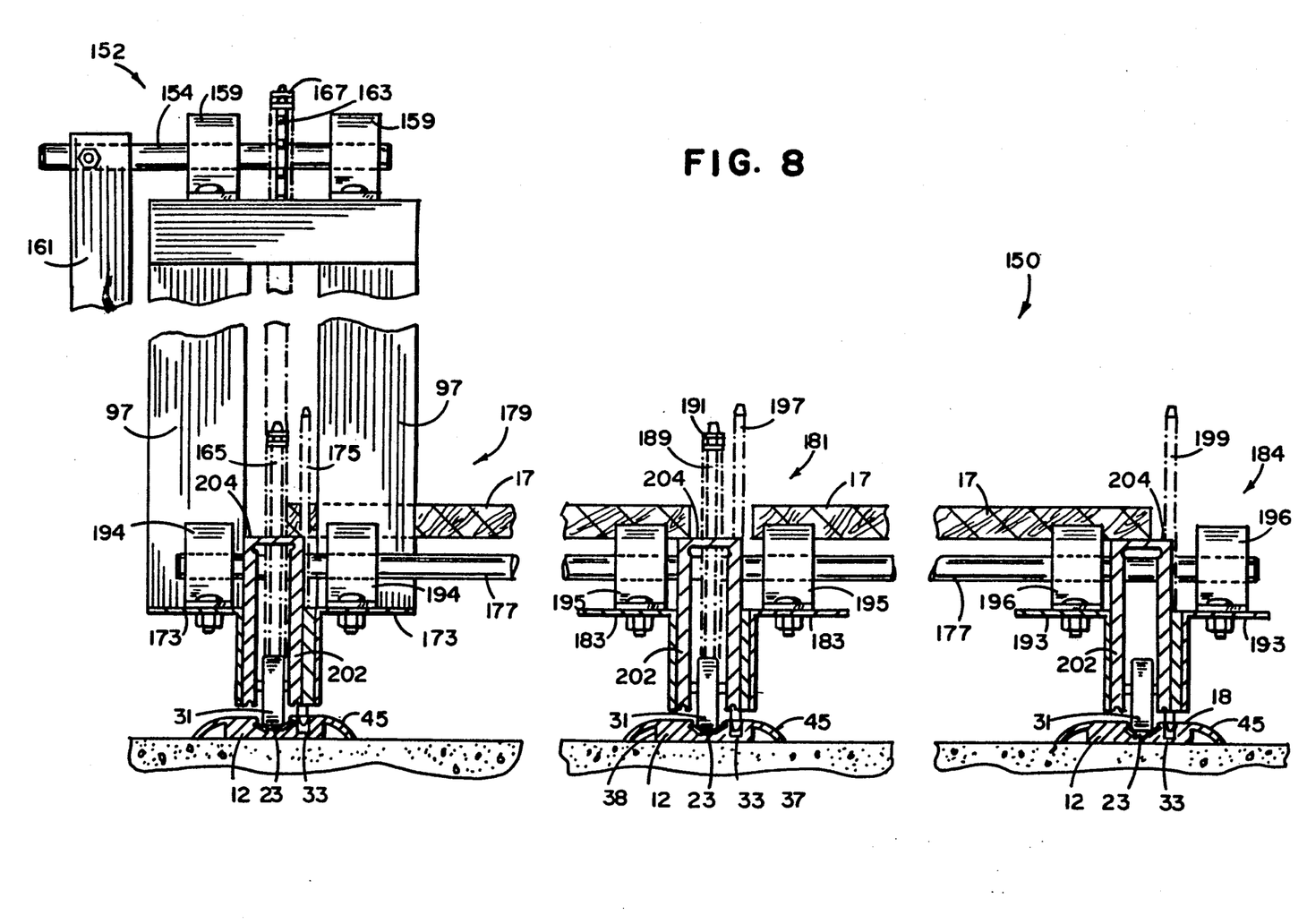
FIG. 8 is a cross-sectional view taken along line VIII—VIII in FIG. 7.

Third embodiment 150 is illustrated with a manual driving arrangement 151 (FIGS. 7 and 8). Of course, embodiment 150 could be driven by an electric motor or other means not shown. An axle 154 is transversely mounted to longitudinal supports 156 through the us of bearing elements 159. Also, fixedly attached to one end of axle 154 is a manual rotating means, such as a hand crank 161. Fixedly mounted on axle 154, for rotation therewith, is a pinion sprocket 163. Below pinion sprocket 163 is positioned a first sprocket wheel 165 which is operably connected to pinion sprocket 163 via chain 167. First sprocket wheel 165 is fixedly attached to drive shaft 169 which is supported on either side thereof by bearing elements 171 attached to brace members 173 In contrast to the first two embodiments 60, 120, however, the drive sprocket 175 is not attached to the drive shaft, but rather to a parallel axle or driven shaft 177 as will be discussed below.

Drive shaft 169 extends outwardly from the side support structure 179 and interconnects the support structure 181 positioned intermediately along the length of the mobile storage unit 17 (FIG. 7). This center support structure 181 also supports drive shaft 169 on its brace members 183 through the use of bearing elements 185. Fixedly mounted to drive shaft 169 in between brace members 183 is a second sprocket wheel 187 Second sprocket wheel 187 is illustrated as being the same size as first sprocket wheel 165; however, it could be constructed as a smaller member to provide additional mechanical advantage to the driving of the mobile storage unit 17.

Mounted directly adjacent to second sprocket wheel 187 and in the same plane therewith, is a third sprocket wheel 189 (FIG. 7). Second and third sprocket wheels 187, 189 are preferably operably interconnected by a chain 191. Of course, this interconnection could be accomplished through direct gear engagement or other connecting means. Third sprocket wheel 189 is fixedly mounted upon driven shaft 177 for rotation therewith. Driven shaft 177 is supported on brace members 173, 183, 193 by bearing elements 194, 195, 196 and thereby interconnects all of the support structures 181, 183, 184. Hence, as driven shaft 177 is rotated by third sprocket wheel 189, it drives all of the driving sprockets 175, 197, 199.

In summary, then, third embodiment 150 is operated as follows. When a user desires to move the particular mobile support unit 17, he rotates hand crank 161 either clockwise or counterclockwise depending on the desired direction of movement. Rotation of hand crank 161 rotates axle 154 which, in turn, creates rotation of pinion sprocket 163. By interconnecting pinion sprocket 163 and first sprocket wheel 165 through the use of chain 167, first sprocket wheel 165 is then also rotated. First sprocket wheel 165 is fixedly mounted upon one end of drive shaft 169. Second sprocket wheel 187 is fixedly mounted on the opposite end of drive shaft 169 and thereby rotates synchronously with first sprocket wheel 165. Third sprocket wheel 189 is operably connected to second sprocket wheel 187 through the use of chain 191, so that it too is rotatably driven. Third sprocket wheel 189 is fixedly attached to driven shaft 177. Driven shaft 177 extends the entire length of mobile storage unit 17 and fixedly mounts thereupon at spaced intervals each driving sprocket 175, 197, 199. These driving sprockets 175, 197, 199 cooperate with openings 33 in the same manner as the driving sprockets 41 of the other two embodiments 60, 120, to evenly and smoothly move mobile storage unit 17 along the length of track members 12. This central driving arrangement reduces the susceptibility of the mobile storage unit 17 to canting and jamming even with heavy and large mobile storage units.

Furthermore, since drive shaft 169 and driven shaft 177 are designed to interconnect the different support structures 181, 183, 184, the elongated supporting arms 202 are constructed as taller members (than in the other embodiments 60, 120) so that the mounting surface 204 for mobile storage unit 17 is raised above the two shafts 169, 177 (FIG. 8). This arrangement, then, permits easy loading of the mobile storage units 17 without interference from shafts 169, 177. Note, however, that openings are provided in the mobile storage units 17 at the points where the sprockets 165, 175, 187, 189, 197, 199 extend upwardly. These cutouts may be left open, or housings (not shown) may be provided so that the items supported by the storage units 17 are not inadvertently damaged by the rotation of the sprockets 165, 175, 187, 189, 197, 199.

Figure 9:
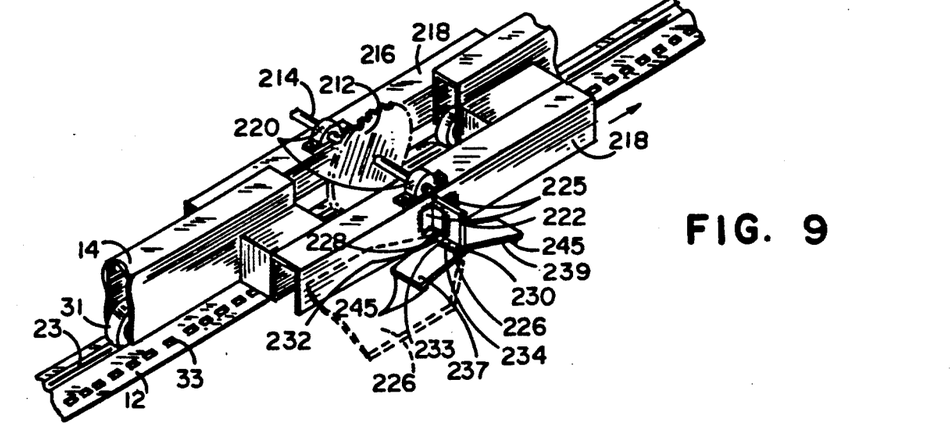
FIG. 9 is a perspective view of a fourth embodiment of the present invention.
Figure 10:
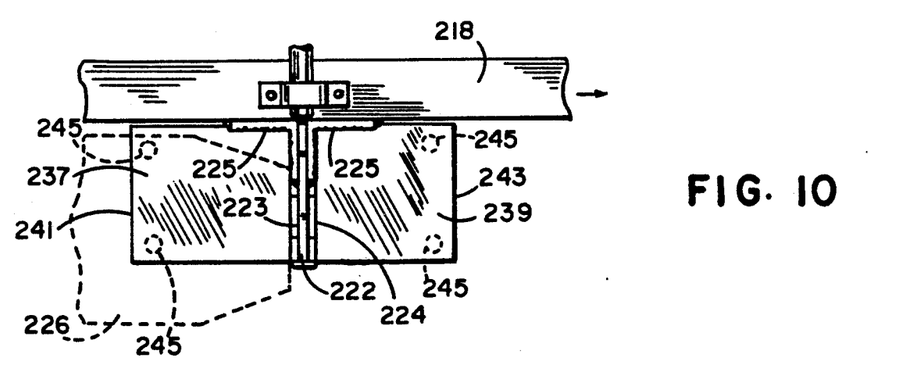
FIG. 10 is an enlarged top plan view of the push plate assembly thereof.
Figure 11:
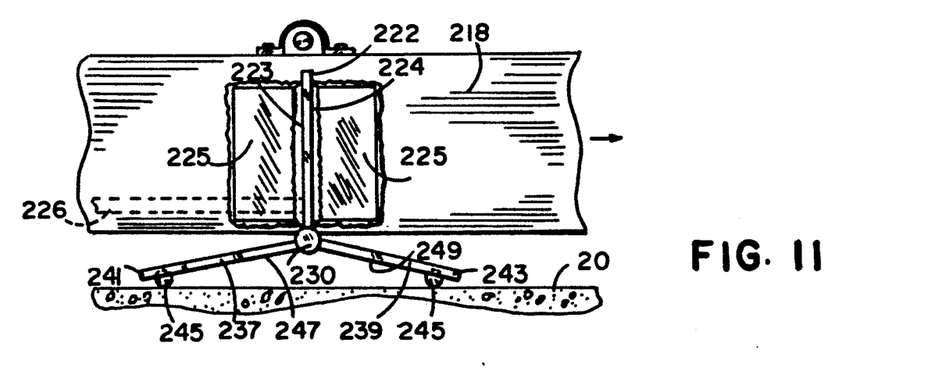
FIG. 11 is an enlarged side elevational view of the push plate assembly thereof.

A fourth embodiment 210 (FIGS. 9–11) is disclosed, which is adapted to cooperate with a conventional forklift truck for providing the driving impetus therefor. In many respects, fourth embodiment 210 is very similar to third embodiment 150, in that both utilize essentially the same support structure design for rollingly supporting the mobile storage units on track members 12. However, cavity 216 is provided with only a single driving sprocket 212 since the motive means is provided externally, as will be discussed below.

Driving sprocket 212 is fixedly mounted to an axle 214 which is secured to brace members 218 via bearing elements 220. Furthermore, as in third embodiment 150, axle 214 extends transversely beneath the supported mobile storage unit to interconnect all of the driving sprockets 212 of the support structures 14 used. This construction tends to better distribute the driving impetus and alleviate the problem of canting and jamming under a heavy load.

Fixedly secured, by welding or the like, to the outside of one brace member 218 is a push plate 222. Push plate 222 projects transversely therefrom in order to provide a pair of opposed abutment surfaces 223, 224 adapted to be abuttingly engaged by the fork 226 of the forklift truck. An L-shaped supporting plate 225 is preferably welded to the brace member 218 and push plate 222 in order to increase the strength of the connection therebetween. A supporting plate 225 may be provided on either or both sides 223, 224 of push plate 222.

Push plate 222 further includes a pair of downwardly extending ears 226, 228 which support a hinge pin 230 therebetween. Also mounted to hinge pin 230 via similar ears 232-234 are a pair of oppositely extending floor plates 237, 239. Floor plates 237, 239 are mounted for free pivotal movement about hinge pin 230 such that their distal ends 241, 243 lie closely along the floor surface 20. Ball bearings 245 or the like are secured to the bottom surfaces 247, 249 near the distal end 241, 243 of each floor plate 237, 239. This arrangement reduces the frictional engagement between floor plates 237, 239 and floor 20 in order to avoid marring of the floor surface 20 and to facilitate an easier moving action for the support structure 14. Floor plates 237, 239 are provided to protect against the fork of the forklift truck inadvertently being positioned under push plate 222 and dislodging the support structures 14 from the tracks 12.

Of course, it is understood that the above are merely preferred embodiments of the invention, and that various other embodiments as well as many changes and alterations may be made without departing from the spirit and broader aspects of the invention as defined in the claims.

The embodiments of the invention in which an exclusive property or privilege is claimed are defined as follows.

1. A mobile storage system for movably supporting at least one mobile storage unit, wherein said system comprises:
   at least three spaced apart track members including first and second outer track members and an inner track member disposed intermediate said outer track members positioned in parallel relationships with each other, each track member being formed as a unitary piece and including an upper surface having a series of openings which are aligned longitudinally along the length of each track member;
   a plurality of support structures including first and second outer support structures and an inner support structure wherein one support structure is movably mounted upon each said track member for movement along the length of its respective track member, each support structure including means for supporting the mobile storage unit;
   a first axle rotatably mounted to said support structures extending transversely across said first outer track member, said inner track member and said second outer track member;
   a plurality of driving sprockets wherein at least one driving sprocket is fixedly mounted on said first axle for co-rotation therewith, each of said driving sprockets disposed in adjacency to one of said track members and having teeth in driving engagement with the series of openings in the track member;
   a drive shaft extending substantially parallel to said first axle having a first end portion rotatably mounted to said first outer support structure and a second end portion rotatably mounted to said inner support structure;
   first drive means disposed adjacent said first outer support structure for rotating said first end portion of said drive shaft; and
   second drive means in operative association with said second end portion of said drive shaft and with the midsection of said first axle, whereby rotation of said drive shaft is drivingly transmitted to the midsection of said first axle and said driving sprockets are rotated so that said mobile storage unit is moved along the lengths of said track members.

2. The mobile storage system of claim 1 in which said second drive means includes:
   a first sprocket wheel fixedly attached to said first axle at the midsection of said first axle;
   a second sprocket wheel fixedly attached to said drive shaft and positioned adjacent to and in alignment with said first sprocket wheel and operably connected thereto for rotation therewith.

3. The mobile storage system of claim 2 in which said second drive means includes:
   a third sprocket wheel fixedly attached to said first end portion of said drive shaft for rotation therewith;
   a second axle rotatably supported on said first outer support structure;
   a pinion sprocket mounted on said second axle for rotation therewith;
   a hand crank fixedly attached to said second axle whereby a user may manually rotate said pinion sprocket through the use of said hand crank; and
   a chain operably interconnecting said pinion sprocket and said third sprocket wheel whereby said mobile storage unit is easily moved along said track member by rotation of said hand crank.

4. The mobile storage system of claim 1 in which said upper surface of each said track member further includes a longitudinally extending guideway which is substantially parallel to said series of said openings; and in which said means for supporting said mobile storage unit includes a pair of oppositely extending support arms, said support arms are aligned with said track member and rotatably mount supporting rollers which extend downwardly therefrom and are received within said guideway for directing and movably supporting said support structures for movement along the lengths of said track members.

5. The mobile storage system of claim 4 in which said support arms include an upper mounting surface upon which is received a portion of said mobile storage unit for support thereof, and wherein said upper surface is positioned above said first axle and said drive shaft, whereby items may be easily stored on said mobile storage unit without interference from said axle and drive shaft.

6. The mobile storage system of claim 1 in which said first drive means include a manual driving mechanism supported on said first outer support structure, wherein said manual driving means is operably connected to said first end portion of said drive shaft, whereby said drive assembly may be moved along the length of said track members in a smooth and easy manner.

7. A mobile shelving system comprising:
track means for defining a plurality of spaced parallel tracks;
carriage means for movably supporting a storage unit on said track means; and
drive means for propelling said carriage means along said track means, said drive means including:
an axle having a plurality of sprocket members fixedly secured to said axle, the sprockets nearest each end of said axle being the end sprockets;
a drivingly rotated drive shaft disposed substantially parallel to said axle and spaced apart therefrom, said drive shaft having a first end portion disposed adjacent an end of said axle and a second end portion disposed adjacent a point approximately midway between said end sprockets;
motive means for drivingly rotating said first end portion of said drive shaft, whereby said second end portion of said drive shaft is also rotated; and
means for drivingly transmitting the rotation of said second end portion of said drive shaft to said axle at said approximately midway point to thereby reduce canting of said carriage means on said track means due to torsional twisting of said axle.

8. The mobile shelving system of claim 7 wherein each of said tracks includes a one-piece track body defining a plurality of longitudinally spaced apertures, and further wherein each of said sprockets engages said spaced apertures in one of said track bodies.

9. The mobile shelving system of claim 8 wherein each of said track bodies includes a wear insert in each of said apertures.

10. A mobile storage system comprising:
a pair of track members each of a unitary construction to be placed on a support surface, each track member defines a guideway means for defining a roller path, and a plurality of spaced apart sprocket holes along the length thereof;
a carriage supported on each said track member, said carriages including rollers riding in said guideway means to movably carry said carriages on said track members; and
drive means operably associated with said carriages for moving said carriages along the length of said track members, said drive means including a sprocket rotatably mounted to each said carriage and fixedly secured to a common axle whereby the rotation of said sprockets are thereby synchronized, to reduce the risk of canting and jamming of the system, each sprocket having teeth sequentially received within said sprocket holes of one of said track members as said sprocket is rotated, and a fork-abutment assembly fixedly secured to said carriage comprising a push plate means for directly engaging a fork of a forklift truck whereby said carriage is pushed along the length of said track by said forklift truck.

11. The mobile storage system of claim 10 in which said fork-abutment assembly includes:
said push plate means having a pair of opposite sides, wherein said push plate means is fixedly attached to said carriage and projects laterally outwardly therefrom; and
a pair of floor plates which are pivotally attached to said push plate means so as to freely extend downwardly therefrom to each side of said push plate means so that distal ends thereof are positioned near the support surface, whereby said floor plates guide said fork of the forklift truck so as to alleviate the risk of positioning said fork under said push plate means and dislodging said carriages from said tracks.

12. The mobile storage system of claim 11 in which each said floor plate includes at least one ball bearing which is adapted to rollingly engage said support surface and thereby carry said floor plates for movement thereacross.

13. A mobile storage system for movably supporting a mobile storage unit, wherein said system comprises:
a carriage having a means for supporting the mobile storage unit, and including a plurality of rollers which movably carry said carriage for movement along a supporting surface;
a fork-abutment fixedly secured to and projecting laterally from said carriage, said fork-abutment having a pair of opposite sides which are adapted to abuttingly engage a fork of a forklift truck, whereby said carriage is pushed along for movement along the supporting surface; and
a pair of ramp surfaces attached to said fork-abutment, wherein one ramp surface extends at an inclination downwardly from one of said opposite sides of said fork-abutment to alleviate the risk of positioning the fork of the forklift truck under said fork-abutment and upsetting said carriage.

14. The mobile storage system of claim 13 in which said ramp surfaces are defined by a pair of elements which are pivotally attached to said fork-abutment for free pivotal movement thereof, so that said ramp surfaces freely extend downwardly so that distal ends thereof are positioned near the support surface.

15. The mobile storage system of claim 14 in which each element defining a ramp surface includes at least one roller means for rollingly engaging said support surface to thereby carry said ramp surface defining elements for movement thereacross.

* * * * *